United States Patent
Revak

(10) Patent No.: US 10,054,004 B2
(45) Date of Patent: Aug. 21, 2018

(54) TURBINE OVERSPEED TRIP TEST DATA LOGGING SYSTEM

(71) Applicant: Thomas William Revak, LaPorte, TX (US)

(72) Inventor: Thomas William Revak, LaPorte, TX (US)

(*) Notice: Subject to any disclaimer, the term of this patent is extended or adjusted under 35 U.S.C. 154(b) by 333 days.

(21) Appl. No.: 14/603,161

(22) Filed: Jan. 22, 2015

(65) Prior Publication Data

US 2015/0204211 A1 Jul. 23, 2015

Related U.S. Application Data

(60) Provisional application No. 61/930,183, filed on Jan. 22, 2014.

(51) Int. Cl.

| | |
|---|---|
| *F01D 21/20* | (2006.01) |
| *F01D 21/00* | (2006.01) |
| *G01H 11/08* | (2006.01) |
| *F01D 21/02* | (2006.01) |
| *G01H 1/00* | (2006.01) |
| *G01M 1/28* | (2006.01) |

(52) U.S. Cl.
CPC ............ *F01D 21/003* (2013.01); *F01D 21/02* (2013.01); *G01H 1/006* (2013.01); *G01H 11/08* (2013.01); *G01M 1/28* (2013.01); *F05D 2260/80* (2013.01); *F05D 2260/83* (2013.01)

(58) Field of Classification Search
CPC ........ F01D 21/003; F01D 21/02; F01D 21/16; F01D 21/20; F05D 2220/31
USPC .... 60/39.24, 646, 647, 657, 660; 73/112.01, 73/112.02; 415/30; 290/40 A
See application file for complete search history.

(56) References Cited

U.S. PATENT DOCUMENTS

| | | | | |
|---|---|---|---|---|
| 3,643,437 A | * | 2/1972 | Birnbaum | F01D 21/02 290/2 |
| 3,928,976 A | * | 12/1975 | Braytenbah | F01D 21/02 290/40 R |
| 4,031,466 A | * | 6/1977 | Krause | G01P 3/489 324/166 |
| 4,246,491 A | * | 1/1981 | Waldron | F01D 17/24 290/40 R |
| 6,075,685 A | * | 6/2000 | Reed | H02H 7/093 361/115 |
| 2007/0138420 A1 | * | 6/2007 | Shindo | F01D 17/22 251/63.6 |

* cited by examiner

*Primary Examiner* — Leslie J Evanisko
(74) *Attorney, Agent, or Firm* — David McEwing

(57) ABSTRACT

A turbine overspeed trip test data logging system is a portable system by which an operator can electronically gather and log data for a turbine overspeed test. A plurality of sensors can be affixed to various components of the turbine for gathering test data to be received and compiled into a turbine test log by a processing unit. A method for processing the gathered sensor data is also provided.

11 Claims, 8 Drawing Sheets

TURBINE OVERSPEED TRIP TEST DATA LOGGING SYSTEM

The current application claims a priority to the U.S. Provisional Patent application Ser. No. 61/930,183 filed on Jan. 22, 2014.

FIELD OF THE INVENTION

The present invention relates generally to a data logging system. More specifically, the present invention is a system to allow routine testing and documentation of turbine overspeed trip systems that includes measurement and recording of all the system components: shaft speed, the activation of the overspeed sensing device and the movement of the stop valve or valves.

BACKGROUND OF THE INVENTION

Every steam or gas turbine installed in the world has a system to protect it from a destructive overspeed event. If the turbine speed reaches a certain level, different for each machine depending on its design, major mechanical failure will occur. Although there are many different designs and configurations for the overspeed trip protection system, every one of them is designed to sense when the shaft speed reaches a predetermined speed limit and then activate a shutdown system.

The simplest and most common protection systems consist of a mechanical device mounted on the shaft that moves when the speed limit is reached. The mechanical device then strikes a stationary mechanism that is linked to a valve. The interaction of the overspeed device and the mechanical linkage results in the rapid closing of a steam or gas valve.

Systems can range from the simplest mechanical designs, as described above, to very sophisticated electronic detection and valve actuation systems with very rapid response times. Whether simple or complex, however, the systems need to be tested from time to time to verify proper operation.

In addition to simply verifying that the system functions, it is also important to measure the response of the system and document all of the results. When a machine is equipped with an electronic control system and that control system is integrated into an overall computerized plant control system (DCS) then it is possible to perform an overspeed test and have the speed history during the test documented. However, the DCS only stores speed versus time and does not measure or record anything else.

There is no system known to this writer which is designed to allow the operator to measure anything more than speed when they are testing a turbine trip system. The "state of the art" for conducting overspeed trip system tests is to visually monitor speed and either watch or listen for the sudden closing of the stop valve. The operator must visually and mentally associate a speed value with the moment the trip system activates. This is true even for a system that records speed as described above.

It is therefore an object of the present invention to allow routine testing and documentation of turbine overspeed trip systems that includes measurement and recording of all the system components: shaft speed, the activation of the overspeed sensing device and the movement of the stop valve or valves.

DETAIL DESCRIPTIONS OF THE INVENTION

Figure 1:
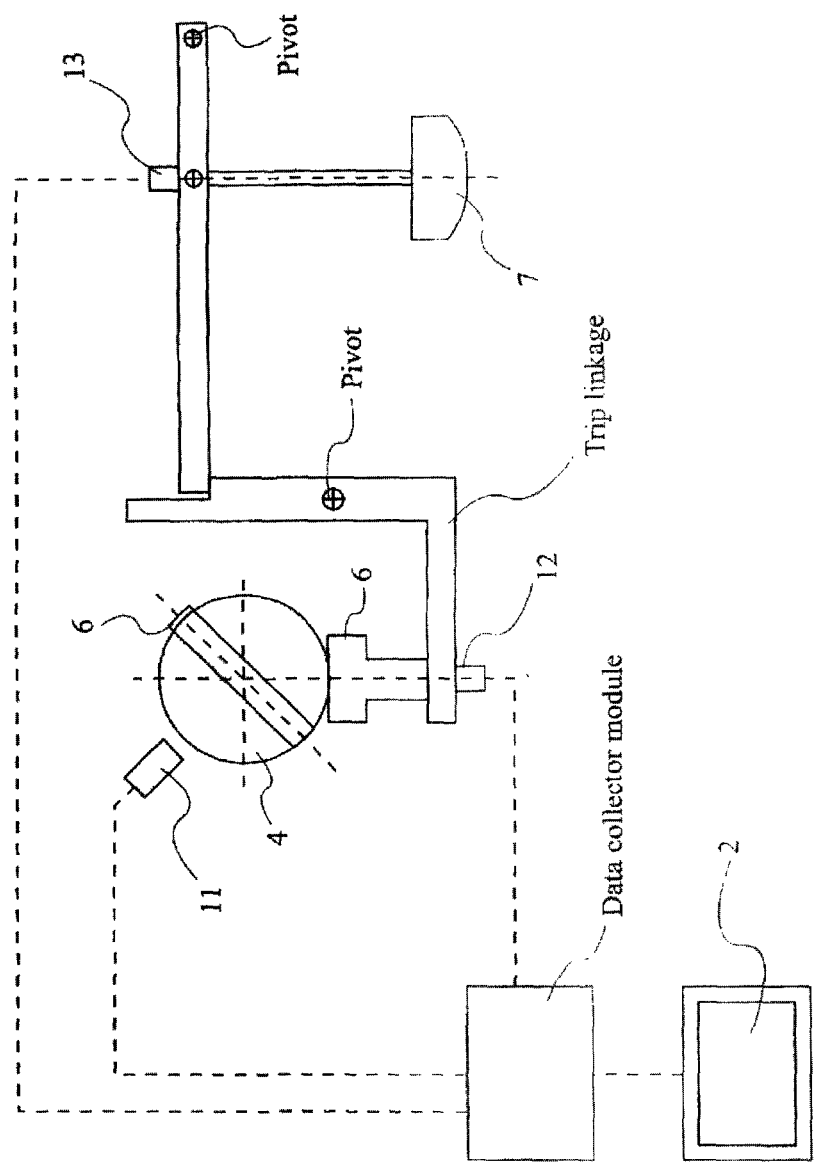
FIG. 1 is a Replacement Sheet of the original Figure wherein the Replacement Sheet comprises a schematic diagram of the present invention in use with a turbine with a mechanical overspeed detection system.
Figure 2:
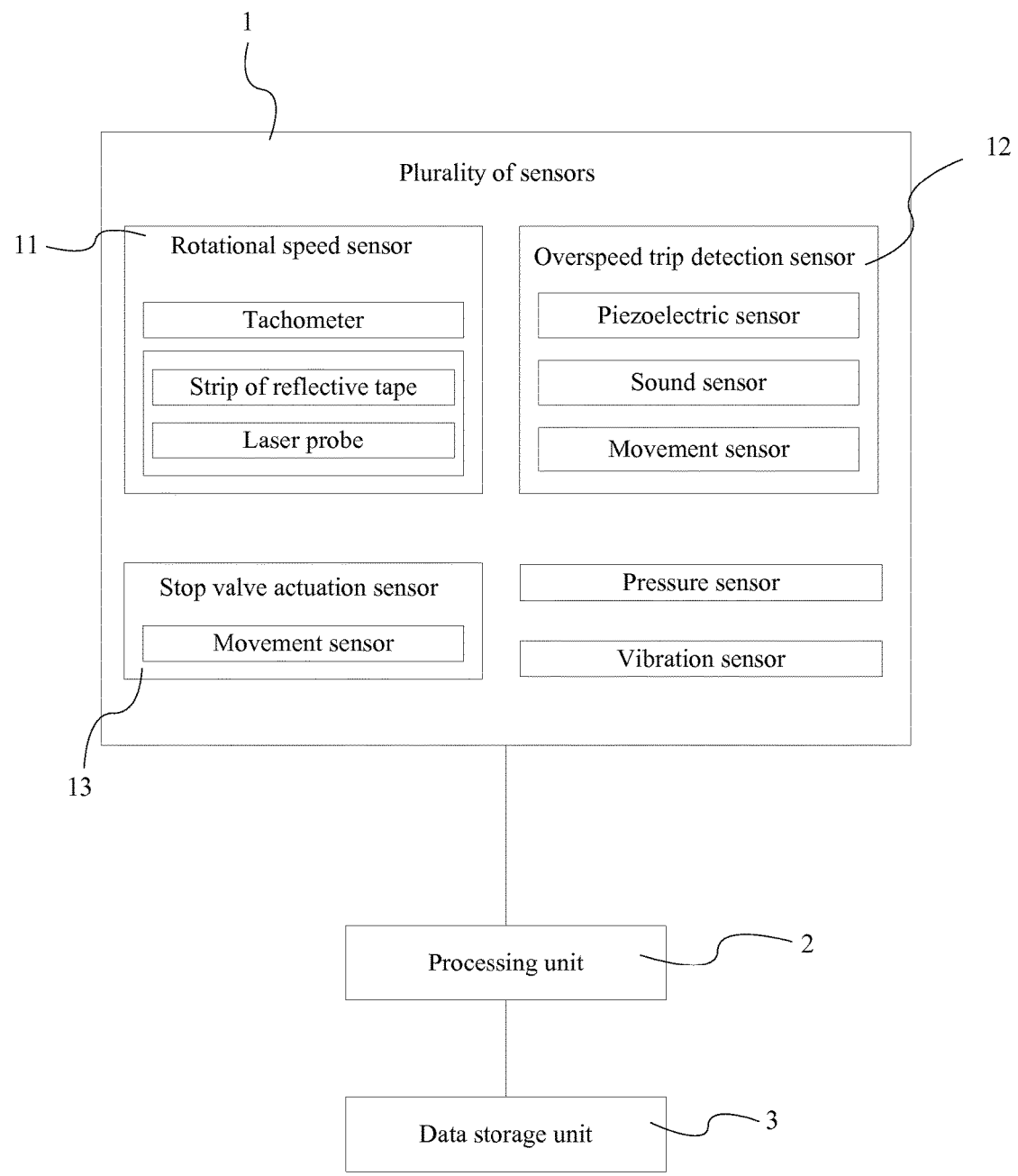
FIG. 2 is a block diagram of the electrical components of the present invention and various possible sensor types to be used.
Figure 3:
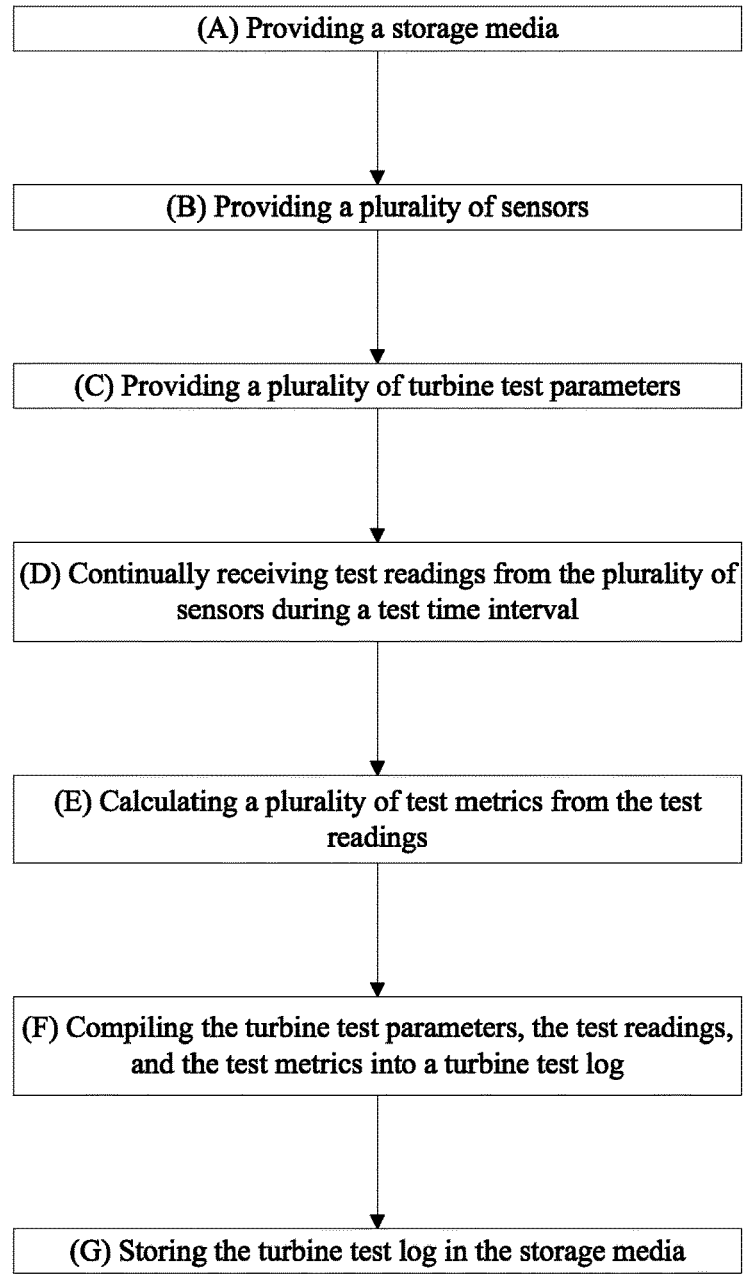
FIG. 3 is a stepwise flow diagram describing the general process of using the present invention.
Figure 4:
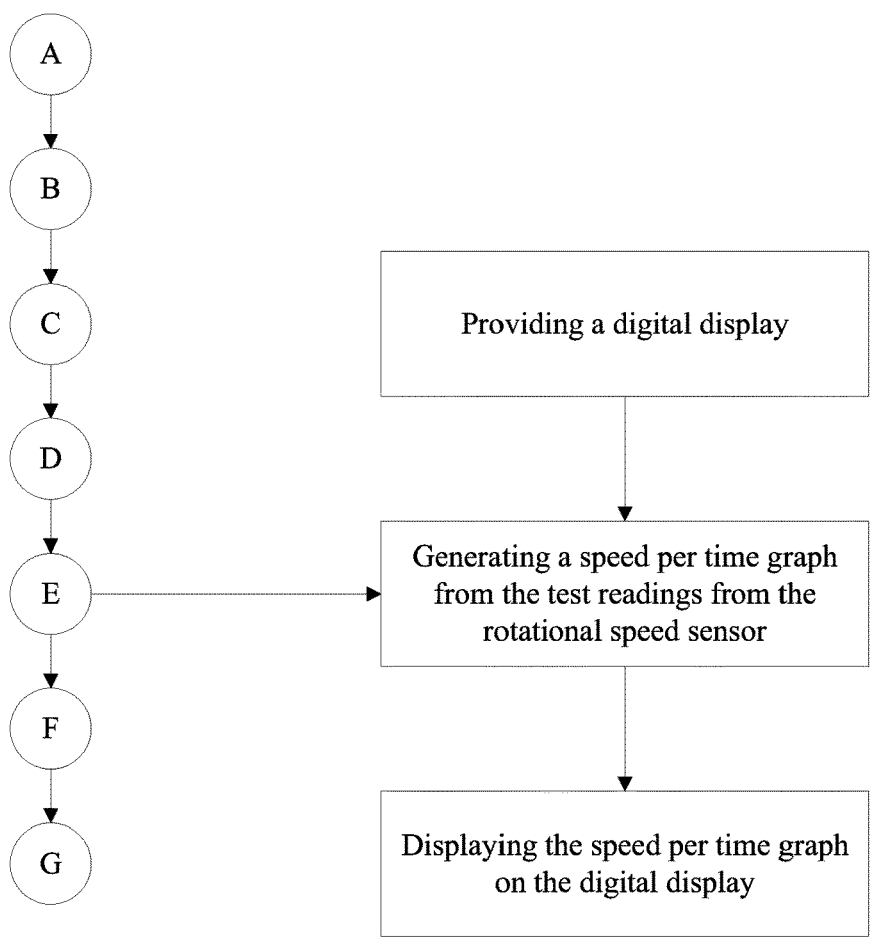
FIG. 4 is a stepwise flow diagram describing the process for processing and displaying speed per time sensor inputs.
Figure 5:
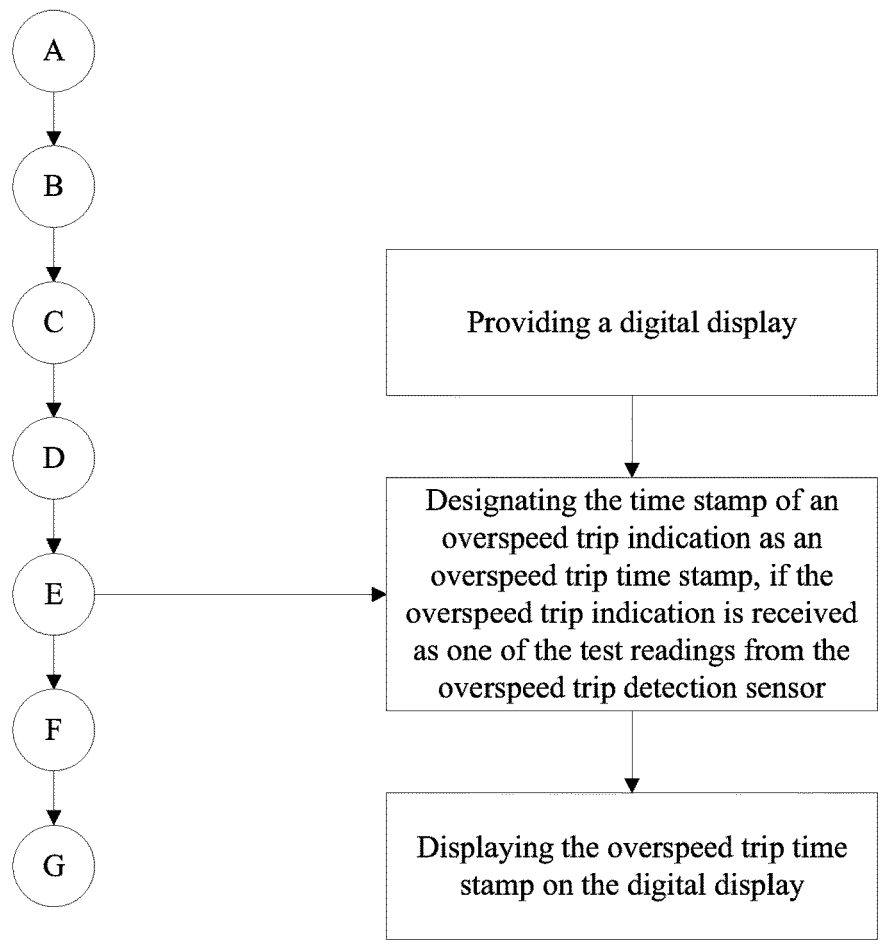
FIG. 5 is a stepwise flow diagram describing the process for processing and displaying an overspeed trip indication.
Figure 6:
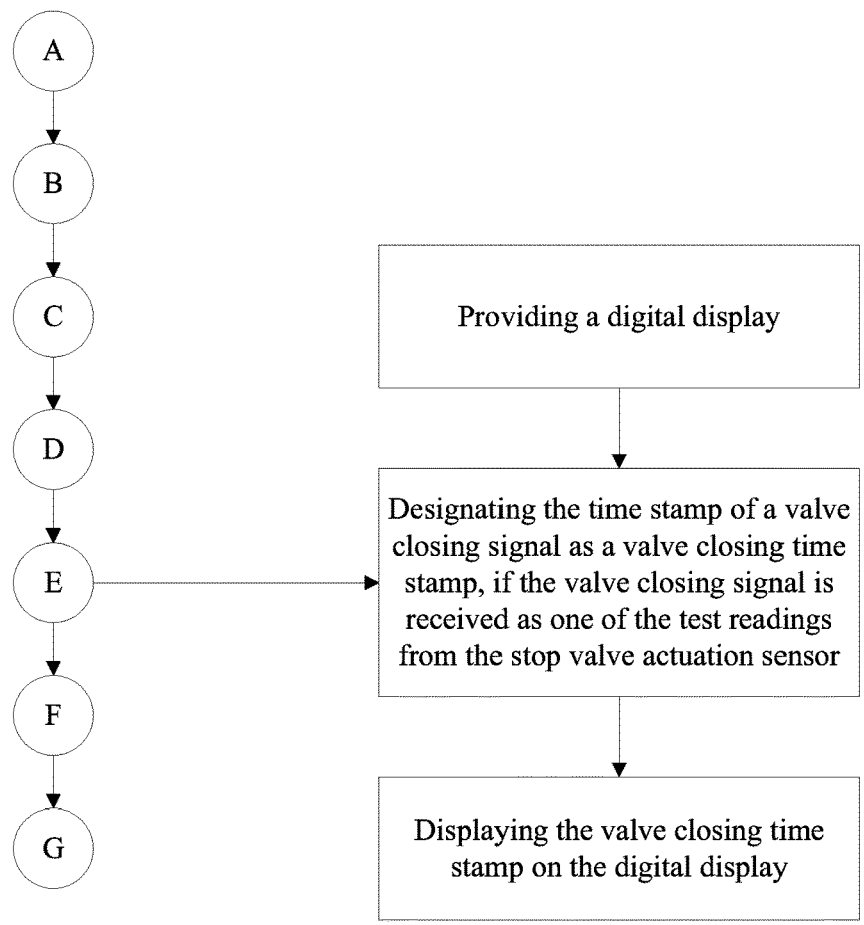
FIG. 6 is a stepwise flow diagram describing the process for processing and displaying a valve closing signal.
Figure 7:
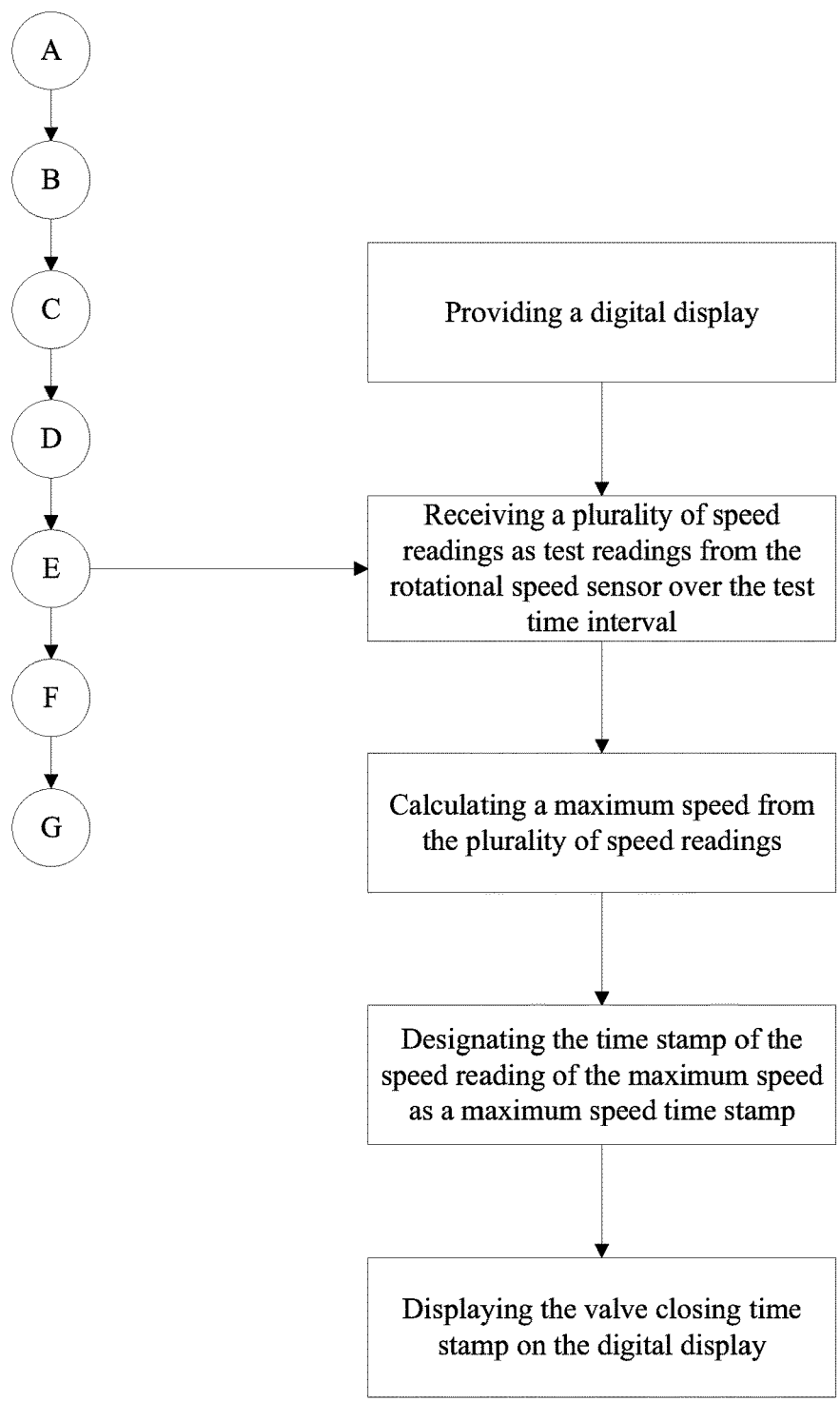
FIG. 7 is a stepwise flow diagram describing the process for processing and displaying a maximum speed for the overspeed test.
Figure 8:
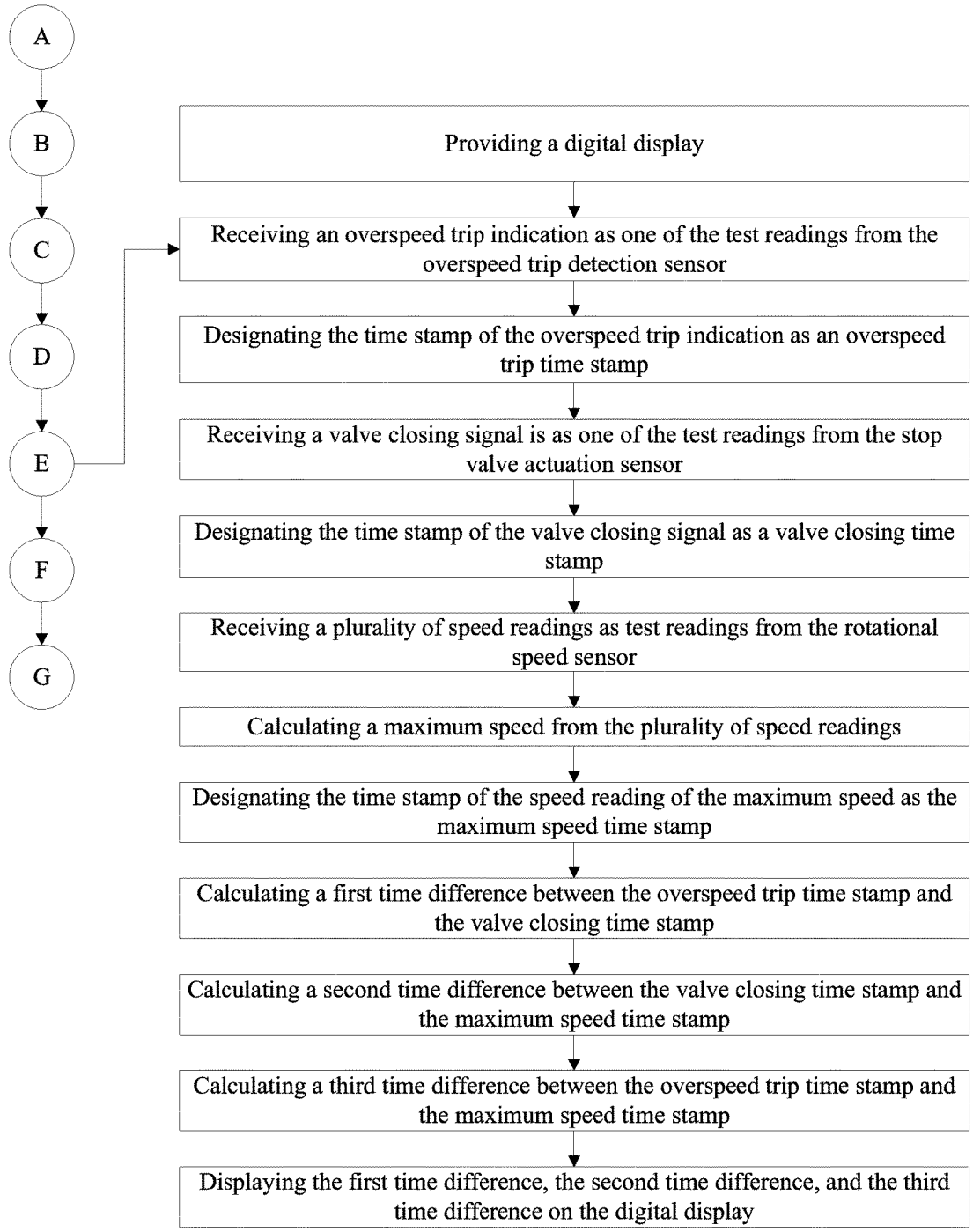
FIG. 8 is a stepwise flow diagram describing the process for processing and displaying several time intervals for the overspeed test.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The purpose of the proposed system is to allow routine testing and documentation of turbine overspeed trip systems, including measurement and recording of all the system components: shaft speed, the activation of the overspeed detection system 6 and the movement of the stop valve 7 or valves. The system will primarily be targeted at the market utilizing simple steam turbines with purely mechanical trip systems and no means of recording speed. It can be adapted, using different sensors, to a turbine with electronic controls so that the existing electronic data can be incorporated into the test system data. The preferred embodiment of the present invention is as a portable kit which can be transported to any given turbine installation location for use. The present invention utilizes a number of sensors, a data processing unit 2, and software for recording and processing data from the sensors in order to create digital logs and documentation for turbine overspeed tests.

In the preferred embodiment, the present invention comprises a plurality of electronic sensors 1, a processing unit 2, and a data storage unit 3. The apparatus of the present invention may be transported in a hardshell enclosure for convenience. In the preferred embodiment, the plurality of sensors 1 comprises a rotational speed sensor 11, an overspeed trip detection sensor 12, and a stop valve actuation sensor 13. The rotational speed sensor 11 measures the rotational speed of a shaft 4 of the turbine to be tested. The overspeed trip detection sensor 12 detects an overspeed condition trip of the turbine, which is caused by an overspeed detection system 6 of the turbine. That is, upon detection of an overspeed condition, the overspeed detection system 6 causes an overspeed condition trip in order to shut down the turbine. The stop valve actuation sensor 13 detects movement of a stop valve 7, which plugs a steam line in order to cut off input to the turbine. The movement of the stop valve 7 is triggered by the overspeed condition trip. The plurality of sensors 1 and the data storage unit 3 are electronically connected to the processing unit 2. The apparatus may include an electrical power supply or power source for operation of the sensors and the data storage unit and processing unit.

It is common for overspeed detection systems to utilize a mechanical means to detect an overspeed condition. In this case, a hollow shaft oriented laterally to the axis of the turbine shaft 4 within the turbine shaft 4 contains a pin affixed to a spring. As the turbine shaft 4 spins faster, the pin experiences centrifugal inertia of motion, causing the pin to move further toward the exterior of the turbine shaft 4. At a certain threshold speed calibrated by the tension of the spring, the pin protrudes from the body of the turbine shaft 4 and strikes a trip linkage, which in turn causes the stop valve 7 to close and prevent any further steam from entering the turbine, effectively shutting the turbine down. While this is one way an overspeed detection system 6 can function, there are many other means for accomplishing the same goal. In this case, the pin striking the trip linkage or trip linkage striker functions as an overspeed trip actuation device 6. In other systems, other overspeed trip actuation device 6s or means may be used, to which the present invention may be adapted accordingly.

To utilize the present invention to perform a turbine overspeed test, each of the plurality of sensors 1 is affixed to one of various components of the turbine and the overspeed detection system 6 of the turbine. In the preferred embodiment of the present invention, the rotational speed sensor 11 is affixed directly to the turbine shaft 4. In this embodiment, the rotational speed sensor 11 comprises a strip of reflective tape and a laser probe. The strip of reflective tape is affixed to the turbine shaft 4, and the strip of reflective tape is read by the laser probe as the turbine rotates in order to measure the rotational speed of the turbine shaft 4. In another embodiment, the rotational speed sensor 11 is a tachometer that is pre-installed and already comprised by the turbine. The processing unit 2 may connect to the tachometer in order to receive data input from the tachometer. In this case, the present invention must additionally comprise an appropriate connection means such as a connector cable or wireless communication device in order to interface with the computer system associated with the turbine or with the tachometer itself. Other types of rotational speed sensors may be used as useful or appropriate, including, but not limited to, magnetic rotational speed sensor, electrical rotational speed sensors, frictional rotational speed sensors, or other rotational speed sensors.

In the preferred embodiment, the overspeed trip detection sensor 12 is removably affixed to the overspeed trip actuation device 6 of the overspeed detection system 6. Alternatively, the overspeed trip detection sensor 12 is removably affixed near the overspeed trip actuation device 6 or to a secondary linkage or device actuated by the overspeed trip actuation device 6, if that is sufficient to acquire sensor readings or required depending on the construction of the overspeed detection system 6. In the preferred embodiment of the present invention, the overspeed trip detection sensor 12 is a piezoelectric sensor. The overspeed trip detection sensor 12 may be a sound sensor or a movement sensor as appropriate for the application. The overspeed trip detection sensor 12 is not limited to being a piezoelectric sensor, however. Detection of the overspeed condition trip may conceivably be done in a variety of ways, and thus the overspeed trip detector may belong to one of a number of sensor types, including, but not limited to: voltage measurement of the current through an electrical solenoid valve, inertia switches, magnetic sensors, friction sensors, or optical sensors.

The stop valve actuation sensor 13 is removably affixed to the stop valve 7 of the overspeed detection system 6. Similar to the overspeed trip detection sensor 12, the stop valve actuation sensor 13 may be removably affixed near the stop valve 7 or to a linkage connected to the stop valve 7 as appropriate, useful or necessary depending on the design of the turbine and/or the overspeed detection system 6. In the preferred embodiment, the stop valve actuation sensor 13 is a movement sensor that detects either when the stop valve 7 begins moving, ends moving, or both. However, similar to the overspeed trip detection sensor 12, the stop valve actuation sensor 13 may belong to any class or type of sensor that facilitates detection of the stop valve 7 closing.

The plurality of sensors 1 of the present invention is not limited to the rotational speed sensor 11, the overspeed trip detection sensor 12 and the stop valve actuation sensor 13. Potentially, any other sensors which can provide valuable data for a turbine overspeed test may be additionally comprised by the plurality of sensors 1. One such additional sensor is a pressure sensor. The purpose of the pressure sensor is to monitor the pressure or steam input to the turbine, which is another variable which can be valuable for operational testing of a turbine. The pressure sensor may either be removably placed within a steam line of the turbine, or the pressure sensor may be a pre-installed component with which the present invention may interface, similar to the tachometer. Additionally, the plurality of sensors 1 may also comprise a vibration sensor which is removably attached to the turbine. The vibration sensor may be any useful sensor for detecting vibration of the turbine shaft 4 such as, but not limited to, an accelerometer, a sound vibration sensor, or another type of vibration sensor. Vibration of the turbine shaft 4 is desirable to measure in order to ascertain whether the turbine shaft 4 has any rotational imbalances which could lead to undesirable wear or damage to the turbine.

It should be noted that more than one individual sensor and/or sensor means may be utilized for each of the rotational speed sensor 11, the overspeed trip detection sensor 12, the stop valve actuation sensor 13, or any additional sensors for measuring various other relevant variable, and each of said sensor is not necessarily limited to a single sensor or sensor type.

In addition to the physical apparatus, the present invention includes a method for utilizing the turbine overspeed trip test data logging system. The method is preferably a software program or multiple software programs which function together or in separate steps in order to adequately collect and process data from the plurality of sensors 1 and to compile a report for evaluation and documentation purposes.

In the method of the present invention, a storage media and the plurality of sensors 1 are provided, in addition to a plurality of turbine test parameters. The plurality of turbine test parameters comprises, but is not limited to, a normal operating speed, a designated overspeed trip speed, a maximum allowable speed, a test date, a test operator identification, and a turbine identification. The designated overspeed trip speed is the speed at which the overspeed detection system 6 is designed to recognize an overspeed condition of the turbine. Each of the plurality of turbine test parameters are predefined and input into the software for each turbine overspeed test as part of a turbine test log.

A plurality of test readings are continually received from the plurality of sensors 1 during a test time interval, with each of the test readings being associated with a time stamp. The time at which any given sensor reading is taken should be able to be identified for evaluation and logging purposes. A plurality of test metrics are calculated from the test readings. Subsequently, the turbine test parameters, the test readings, and the test metrics are compiled into a turbine test log, and the turbine test log is stored in the storage media.

In order to review the turbine test log, a digital display is provided. The processing unit 2 and/or storage media, whatever form they take, is electronically connected to the digital display. Each of the test metrics is displayed on the digital display alongside any appropriate labeling for documentation purposes.

One of the test metrics is a speed per time graph. The speed per time graph is generated from the test reading from the rotational speed sensor 11, and the speed per time graph is displayed on the digital display. Another test metric is an overspeed trip indication. The time stamp of the overspeed trip indication is designated as an overspeed trip time stamp if the overspeed trip indication is received as one of the test readings from the overspeed trip detection sensor 12. Upon viewing the turbine test log, the overspeed trip time stamp is displayed on the digital display. Another test metric is a valve closing time stamp. If a valve closing signal is received as one of the test readings from the stop valve actuation sensor 13, the time stamp of the valve closing signal is designated as a valve closing time stamp. The valve closing time stamp is subsequently displayed on the digital display as part of the turbine test log.

Another of the test metrics is a maximum speed. A plurality of speed readings is received as test readings from the rotational speed sensor 11 over the test time interval, wherein each of the plurality of speed readings is a rotational speed of the turbine shaft 4 at an associated point in time. The maximum speed is calculated from the plurality of speed readings, and the time stamp of the speed reading of the maximum speed is designated as the maximum speed time stamp. The maximum speed may be calculated from the plurality of speed readings by any useful algorithm for finding the maximum value from a plurality of values.

It is also desirable to calculate several other time intervals for the turbine test log. Such time intervals include, but are not limited to, the time between the overspeed trip and the stop valve 7 closing, the time between the stop valve 7 closing and the maximum speed, and the time between the overspeed trip and the maximum speed. To this end, a first time difference is calculated between the overspeed trip time stamp and the valve closing time stamp. Similarly, a second time difference is calculated between the valve closing time stamp and the maximum speed time stamp, and a third time difference is calculated between the overspeed trip time stamp and the maximum speed time stamp. The first time difference, the second time difference, and the third time difference are displayed on the digital display as part of the turbine test log along with appropriate labeling. Another desirable time interval to calculate may include but is not limited to a time difference between when the stop valve 7 begins to close and when the stop valve 7 finishes closing, in order to more precisely evaluate the overspeed trip detection system.

Although the invention has been explained in relation to its preferred embodiment, it is to be understood that many other possible modifications and variations can be made without departing from the spirit and scope of the invention as hereinafter claimed.

What I claim is:

1. A transportable turbine overspeed trip test data logging system for testing and documenting of a turbine overspeed trip system, wherein the turbine overspeed trip test data logging system comprises;
    (a) a plurality of sensors structured to be temporarily and removably attached to turbine components, wherein the sensors can be attached or removed before or after an overspeed trip test without disassembly of the turbine components;
    wherein the plurality of sensors comprise:
        (i) a rotational speed sensor structured to measure the rotational speed of a shaft of a turbine;
        (ii) an overspeed detection sensor structured to detect an overspeed condition trip of the turbine; and
        (iii) a stop valve actuation sensor structured to detect movement of a turbine stop valve during a stop valve closing action;
    (b) a processing unit (i) that is structured and configured to receive and process data from each of the plurality of sensors, (ii) that compiles the processed data into a turbine test log, and that (iii) communicates information pertaining to action of the turbine overspeed trip system; wherein the information includes but is not limited to data pertaining to the timing of the stop valve closing action with respect to timing of the overspeed condition trip; and
    (c) an electronic data storage unit;
    wherein the plurality of sensors and the electronic data storage unit are electronically connected to the processing unit.

2. The turbine overspeed trip test data logging system as claimed in claim 1 further comprising: the rotational speed sensor being removably attached to a tachometer of the turbine, wherein the processing unit may receive data input from the tachometer.

3. The turbine overspeed trip test data logging system as claimed in claim 1 further comprising: the overspeed detection sensor being removably affixed to an overspeed trip actuation device of the turbine overspeed trip system.

4. The turbine overspeed trip test data logging system as claimed in claim 1 further comprising: the stop valve actuation sensor being removably affixed to the turbine stop valve of the turbine overspeed trip system.

5. The turbine overspeed trip test data logging system as claimed in claim 1 further comprising: the overspeed detection sensor being a piezoelectric sensor, wherein the piezoelectric sensor is attached to an overspeed trip actuation device.

6. The turbine overspeed trip test data logging a system as claimed in claim 1 further comprising: the overspeed detection sensor being a sound sensor.

7. The turbine overspeed trip test data logging system as claimed in claim 1 further comprising: the stop valve actuation sensor being a movement sensor.

8. The turbine overspeed trip test data logging system as claimed in claim 1 further comprising: the plurality of sensors further comprising a vibration sensor, wherein the vibration sensor is removably attached to the turbine.

9. The turbine overspeed trip test data logging system as claimed in claim 1 wherein the information includes but is not limited to a duration of stop valve closing action.

10. The turbine overspeed trip test data logging system of claim 1 further comprising a power supply in communication with the processing unit or data storage unit.

11. The turbine overspeed trip test data logging system as claimed in claim 1 further comprising: the overspeed detection sensor being a motion sensor.

\* \* \* \* \*